United States Patent
Quellet et al.

(10) Patent No.: US 8,357,651 B2
(45) Date of Patent: Jan. 22, 2013

(54) AMINOPLAST MICROCAPSULES CONTAINING FRAGRANCE

(75) Inventors: Christian Quellet, Bienne (CH); Jutta Hotz, Zürich (CH)

(73) Assignee: Givaudan SA, Vernier (CH)

( * ) Notice: Subject to any disclaimer, the term of this patent is extended or adjusted under 35 U.S.C. 154(b) by 253 days.

(21) Appl. No.: 12/865,402

(22) PCT Filed: Feb. 9, 2009

(86) PCT No.: PCT/CH2009/000052
§ 371 (c)(1),
(2), (4) Date: Sep. 1, 2010

(87) PCT Pub. No.: WO2009/100553
PCT Pub. Date: Aug. 20, 2009

(65) Prior Publication Data
US 2010/0323938 A1    Dec. 23, 2010

(30) Foreign Application Priority Data
Feb. 11, 2008  (GB) .................................. 0802489.5

(51) Int. Cl.
*C11D 3/50* (2006.01)
(52) U.S. Cl. .......................................................... 512/4
(58) Field of Classification Search ........................ 512/4
See application file for complete search history.

(56) References Cited

U.S. PATENT DOCUMENTS

| | | | | |
|---|---|---|---|---|
| 4,753,759 A | * | 6/1988 | Fukuo et al. | 264/4.7 |
| 8,119,857 B2 | * | 2/2012 | Harris et al. | 800/288 |
| 2003/0050220 A1 | * | 3/2003 | Trinh et al. | 510/521 |

FOREIGN PATENT DOCUMENTS

| | | |
|---|---|---|
| EP | 0508576 A1 | 2/1992 |
| WO | 0196011 A1 | 12/2001 |
| WO | 2006129252 A | 12/2006 |
| WO | 2007004610 A1 | 1/2007 |
| WO | 2008098387 A | 8/2008 |

* cited by examiner

*Primary Examiner* — John Hardee
(74) *Attorney, Agent, or Firm* — Norris McLaughlin & Marcus PA

(57) ABSTRACT

Aminoplast microcapsules comprising a core of fragrance and a shell of aminoplast polymer, the composition of the shell being from 75-100% of a thermoset resin comprising 50-90% of a terpolymer and from 10-50% of a polymeric stabilizer; the terpolymer comprising:
(a) from 20-60% of moieties derived from at least one polyamine;
(b) from 3-50% of moieties derived from at least one polyol; and
(c) from 20-70% of substituted methylene moieties,
the microcapsules additionally optionally comprising up to 25% of a cationic polymer.
The capsules are competitive with known aminoplast capsules and have the major advantage that they are formaldehyde-free.

17 Claims, No Drawings

AMINOPLAST MICROCAPSULES CONTAINING FRAGRANCE

This is an application filed under 35 USC 371 of PCT/CH2009/000052.

This invention is concerned with liquid compositions containing stable, water-dispersible, electrically-charged and highly fabric-substantive aminoplast microcapsules that are essentially free of bound and free formaldehyde.

It is well known that ingredients such as fragrances, insecticides, malodour counteracting substances, fungicides and mildewicides, and the like may be encapsulated in a microcapsule comprising a solid shell or membrane, which protects them from their immediate environment and acts as means for their controlled release. A popular and convenient method of producing such encapsulated formulations consists of dispersing the ingredient in a liquid and creating a polymeric membrane on the surface of the droplets.

A much-used way of doing this is by means of the interfacial polycondensation of various co-monomers and macromers. The polycondensation of amine compounds such as urea and melamine (2,4,6-triamino-1,3,5-triazine) with formaldehyde to form so-called aminoplast microcapsules is the most popular among these processes, leading to shells consisting of highly cross-linked resins (also known as thermoset resin).

These established processes essentially convert emulsions consisting of a dispersed oil phase containing the ingredient to be encapsulated and a continuous water phase into a suspension of solid beads consisting of a core surrounded by a membrane, whose permeability depends on a number of factors, including the extent of cross-linking, and/or the thickness of said membrane.

When applied to fragrances, these microcapsules are typically used for generating surprising sensory effects, such as an increased perfume intensity, or impact, at some point in time when the microcapsules are broken by the action of pressure or rubbing. This strategy is used in so-called "scratch-and-sniff" systems. They are often used in conjunction with non-encapsulated perfume in consumer products.

Melamine-formaldehyde resins are especially suitable for perfume encapsulation, because of their remarkable property of providing highly cross-linked networks capable of retaining small molecules, such as those encountered in perfumes. Furthermore, microcapsule shells comprising aminoplast terpolymer, containing polyol moieties, and especially aromatic polyol moieties provide excellent perfume retention, even under drastic storage conditions, such as those encountered during the storage of consumer products containing high levels of surfactants.

However, melamine-formaldehyde microcapsules contain free formaldehyde, either due to unreacted formaldehyde precursors and/or generated during storage of the microcapsules, especially in acidic conditions. Formaldehyde is a very undesirable substance, and its emission should be minimal, preferably non-existent. The traditional way of combating this has been the use of formaldehyde scavengers, compounds able to react with formaldehyde to form a stable condensate. Examples include urea, amino acids, beta-keto esters and ethylene urea. However, these can affect the integrity of the microcapsule shell.

It has now been found that it is possible to prepare melamine-based microcapsules comprising an aminoplast terpolymer containing polyol moieties, and especially aromatic polyol moieties, which is essentially free of formaldehyde, while still being highly cross-linked, and thereby offering high perfume retention, even under drastic storage conditions, such as prolonged exposure to storage temperatures as high as 45° C. and in the presence of high levels of surfactants.

There are therefore provided microcapsules comprising a core of fragrance and a shell of aminoplast polymer, the composition of the shell being from 75-100% of a thermoset resin comprising 50-90%, preferably from 60-85%, of a terpolymer and from 10-50%, preferably from 10-25%, of a polymeric stabilizer; the terpolymer comprising:
(a) from 20-60%, preferably 30-50% of moieties derived from at least one polyamine;
(b) from 3-50%, preferably 5-25% of moieties derived from at least one polyol; and
(c) from 20-70%, preferably 40-60% of substituted methylene moieties, the microcapsules additionally optionally comprising up to 25%, preferably up to 10% of a cationic polymer.

In this description, unless otherwise specifically stated, all percentages are by weight.

By "moiety" is meant a chemical entity, which is part of the terpolymer and which is derived from a particular molecule. The terpolymer hereinabove described may be any terpolymer comprising the moieties hereinabove described, and it may be prepared by any of the many suitable methods known to the art.

The use of the term "derived from" does not necessarily mean that the moiety in the terpolymer is directly derived from the substance itself, although this may be (and often is) the case.

Examples of suitable polyamine moieties include, but are not limited to, those derived from urea, melamine, 6-substituted-2,4-diamino-1,3,5 triazin, such as benzoguanamine, and glycoluril.

Polyol moieties may be selected from aromatic, aliphatic and polymeric polyol moieties. Examples of suitable aromatic polyol moieties include, but are not limited to, those derived from, or having the form of those derived from, phenol, 3,5-dihydroxy toluene, Bisphenol A, resorcinol, hydroquinone, xylenol, polyhydroxy naphthalene and polyphenols produced by the degradation of cellulose and humic acids. Examples of suitable aliphatic polyols include, but are not limited to 2,2-dimethyl-1,3-propane diol, 1,1,1-tris-(hydroxymethyl)-propane, pentaerythritol, sorbitol, sugars and the like.

The substituted methylene moieties have the general formula (1)

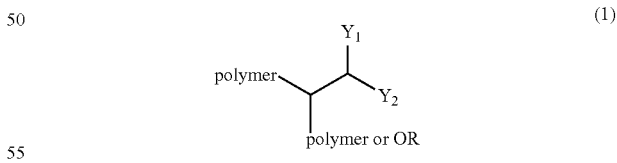

(1)

where R is either a hydrogen atom or an alkyl group and $Y_1$ and $Y_2$ are substituents selected from sigma acceptor groups, alkyne groups and metal sulphonates. By "sigma acceptor group" is meant a group that induces a partial positive charge on the carbon atom adjacent to it (by polarization of the sigma orbital involved in the carbon-Y bond) in such a way that a positive charge appears. Examples of such groups include hydroxyl, alkoxide, phenyl-oxy, alkyl and aryl carboxylate, cyano, phenyl and substituted phenyl.

Such substituted methylene moieties are thus either terminal groups on polymer chains (when OR is present) or crosslinking moieties, when the bonds remote from the $Y_1$, $Y_2$ moieties are both attached to polymers.

Binding of the substituted methylene to the polymer occurs via the formation of either a carbon-nitrogen bond with the polyamines, or carbon-carbon or carbon-oxygen bond with the polyols.

The substituted methylene moieties may be derived from compounds having the general formula (2) or (3).

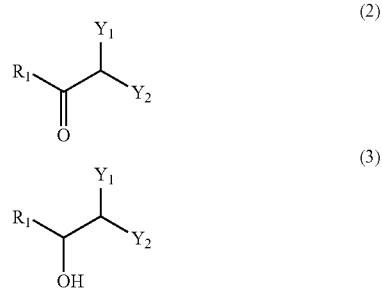

where R1 is either a hydrogen atom or an alkoxide group, and $Y_1$ and $Y_2$ are substituents selected from sigma acceptor groups, as hereinabove defined, or alkyne groups, or metal sulfonates. Examples of substances corresponding to formula (2) are ethyl 2-ethoxy-2-hydroxy acetate, methyl 2-hydroxy-2-methoxy acetate and corresponding alkylated variants with C3 to C6 alkyl chains, 2,2-dimethoxy-acetic acid methyl ester, 2,2-diethoxy-acetic acid ethyl ester and corresponding alkylated variants with C3 to C6 alkyl chains, 2,2-dimethoxy ethanal, di-phenoxy ethanal.

In a specific embodiment, substances of formula (2) are obtained from the reaction of resorcinol with glyoxylic acid.

The polymeric stabilizer prevents the microcapsules from agglomerating, thus acting as a protective colloid. It is added to the monomer mixture prior to polymerisation, and this results in its being partially retained by the polymer, while another part passes into the continuous phase.

Particular examples of suitable polymeric stabilizers include acrylic copolymers bearing sulfonate groups, such as those available commercially under the trade mark LUPASOL (ex BASF), such as LUPASOL PA 140 or LUPASOL VFR; copolymers of acrylamide and acrylic acid, copolymers of alkyl acrylates and N-vinylpyrrolidone, such as those available under the trade mark Luviskol (e.g. LUVISKOL K 15, K 30 or K 90 ex BASF); sodium polycarboxylates (ex Polyscience Inc.) or sodium poly(styrene sulfonate) (ex Polyscience Inc.); vinyl and methyl vinyl ether—maleic anhydride copolymers (e.g. GANTREZ AN, ex ISP), ethylene, isobutylene or styrene-maleic anhydride copolymers, and methyl vinyl ether—maleic acid copolymers (GANTREZ S, ex ISP). Hence the preferred polymer stabilizers are anionic or anionogene polyelectrolytes.

Optionally, the microcapsules may be coated with a cationic polymer. The cationic polymer allows partial or complete neutralization of the negative electrical charge borne by the microcapsules, or even the conversion of the negatively-charged microcapsules into positively-charged microcapsules.

Preferred cationic polymers comprise cationic cellulose derivatives, such as those available under the Trade Mark UCARE (ex Amerchol), and quaternized gums, such as quaternized guar gums available under the Trade Mark JAGUAR (ex Rhodia), polyethylene imine, such as those available commercially under the Trade Mark LUPASOL (ex BASF), cationic polyacrylates and acrylamides, gelatine and quaternized protein hydrolysates, and quaternized amino silicones.

Other cationic compounds that can be used include the Polyquaternium range, all of which have a plurality of quaternary ammonium groups, polymeric species such as diallyl dimethyl ammonium chloride/acrylamide polymers, for example, those available under the Trade Mark MERQUAT (ex Nalco), and copolymers of vinyl pyrrolidone and quaternized dimethylaminoalkyl methacrylate, for example, those available under the Trade Mark GAFQUAT HS 50 and HS 100 (ex ISP).

Microcapsules of the type hereinabove described are provided in the form of aqueous slurry, having typically 15 to 50% solids content, where the term "solids content" refers to the total weight of the microcapsules. The average size of the microcapsules may range between 1 micrometer to 100 micrometers, or more, depending on the mixing shear stress applied to the system during microcapsule formation. The selection of the most appropriate microcapsule size range and size distribution depends on the application envisioned. In the case where the microcapsules are used in laundry products, it has been found that microcapsules having size ranging from 5 to 60 micrometers offer optimal performance in terms of deposition and olfactive impact when rubbed with small to moderate shear stress.

The slurry may contain formulation aids, such as stabilizing and viscosity control hydrocolloids, and biocides.

Typically, hydrocolloids are used to improve the colloidal stability of the slurry against coagulation, sedimentation and creaming. The term "hydrocolloid" refers to a broad class of water-soluble or water-dispersible polymers having anionic, cationic, zwitterionic or non-ionic character. Hydrocolloids useful for the sake of the present invention encompass: polycarbohydrates, such as starch, modified starch, dextrin, maltodextrin, and cellulose derivatives, and their quaternized forms; natural gums such as alginate esters, carrageenan, xanthanes, agar-agar, pectines, pectic acid, and natural gums such as gum arabic, gum tragacanth and gum karaya, guar gums and quaternized guar gums; gelatine, protein hydrolysates and their quaternized forms; synthetic polymers and copolymers, such as poly(vinyl pyrrolidone-co-vinyl acetate), poly(vinyl alcohol-co-vinyl acetate), poly((meth)acrylic acid), poly(maleic acid), poly(alkyl(meth)acrylate-co-(meth)acrylic acid), poly(acrylic acid-co-maleic acid)copolymer, poly(alkyleneoxide), poly(vinylmethylether), poly (vinylether-co-maleic anhydride), and the like, as well as poly-(ethyleneimine), poly((meth)acrylamide), poly(alkyleneoxide-co-dimethylsiloxane), poly(amino dimethylsiloxane), and the like, and their quartenized forms;

The microcapsules according to the invention are further characterized by a nominal shell to core mass ratio lower than 15%, preferably lower than 10% and most preferably lower than 5%. Hence, the microcapsules may have extremely thin and frangible shells.

The shell to core ratio is obtained by measuring the effective amount of encapsulated perfume oil microcapsules that have been previously washed with water and separated by filtration. This is achieved by extracting the wet microcapsule cake by microwave-enhanced solvent extraction and subsequent gas chromatographic analysis of the extract.

Compared to the aminoplast microcapsules of the prior art, the microcapsules and microcapsule slurries of the present invention display the advantage of being essentially free of free or nascent formaldehyde. This means that, when added to and stored over months in acidic consumer products, said microcapsules and slurries do not release free formaldehyde. The use of formaldehyde scavengers is therefore not required.

Furthermore, the use of an aminoplast terpolymer containing polyol moieties, and especially aromatic polyol moieties, leads to a number of unexpected advantages compared to the prior art, for example:

- the microcapsules have the ability to accommodate a much wider range of fragrance compositions than has previously been the case, including fragrance compositions whose encapsulation has been difficult or even impossible by known methods,
- the overall amount of shell material required to build up a stable microcapsule is considerably reduced, leading to thinner capsule walls and much better frangibility to stability balance than has been hitherto achievable. This leads to a surprisingly high perfume retention, compared to the very small thickness of the microcapsule wall,
- the microcapsules are much less prone to plasticization by external, non-encapsulated fragrances,
- the microcapsules can be used in the anionic form, i.e. without any cationic coating, in fabric care conditioners, without impeding their substantivity on cotton, polyester and other fabrics. This is a surprising results, which cannot be anticipated from the prior art.

In a particular embodiment, the microcapsule slurry according to the invention is furthermore capable of releasing electrically-charged microcapsules, characterized by an absolute zeta-potential ranging from 0.1 mV to 100 mV when dispersed in deionised water.

By "zeta-potential" ($\zeta$) is meant the apparent electrostatic potential generated by any electrically charged objects in solution, as measured by specific measurement techniques. A detailed discussion of the theoretical basis and practical relevance of the zeta-potential can be found, e.g., in "Zeta Potential in Colloid Sciences" (Robert. J. Hunter; Academic Press, London 1981, 1988). The zeta-potential of an object is measured at some distance from the surface of the object and is generally not equal to and lower than the electrostatic potential at the surface itself. Nevertheless, its value provides a suitable measure of the capability of the object to establish electrostatic interactions with other objects present in the solution, such as surfactants, polyelectrolytes and surfaces.

The zeta-potential is a relative measurement and its value depends on the way it is measured. In the present case, the zeta-potential of the microcapsules is measured by the so-called phase analysis light scattering method, using a Zeta-PALS instrument (ex Brookhaven Instruments Corporation). The zeta-potential of a given object may also depend on the quantity of ions present in the solution. The values of the zeta-potential specified in the present application are measured in deionised water, where only the counter-ions of the charged microcapsules are present.

By "absolute zeta-potential" ($|\zeta|$) is meant the absolute value of the zeta-potential without reference to its (positive or negative) sign. Hence, negatively-charged objects having a zeta-potential of −10 mV and positively charged species having a zeta-potential of +10 mV have the same absolute zeta-potential.

In a particular embodiment, a composition utilising the microcapsules hereinabove described is characterized by its ability to deliver microcapsules for fabric care conditioners, the microcapsules having a negative zeta-potential ranging from −0.1 mV and −100 mV when dispersed in deionised water.

The microcapsules are highly frangible, by which is meant the ability of the dry microcapsules according to the invention to break and release the encapsulated perfume under the action of a normal bursting force not superior to 9 mN for microcapsules having a diameter of 60 micrometers and not superior to 3 mN for microcapsules having a diameter of 35 micrometers, which corresponds to a bursting pressure not higher than $6 \times 10^6$ MPa. Typically, the bursting pressure of microcapsules according to the present invention does not exceed 1 to 10 MPa, preferably 4 to 7 MPa. Both bursting force and bursting pressure may be measured by various methods, such as a nano-indentation test, or an osmotic rupture test. These aforementioned forces refer to the ones currently applied to a garment when it is folded, put on, worn or taken off.

A typical nano-indentation test is conducted as follows: the slurry of suspended microcapsules is diluted with deionized water and applied on to a polished and ($N_2/O_2$) plasma-cleaned aluminum holder. After evaporation of the water, the holder having discrete microcapsules on its surface is transferred to a MTS Nanoindenter XP equipped with a 60 micrometer diamond flat top indenter body. All compression tests are performed under controlled displacement mode with a displacement rate of 100 nanometer/sec. The load vs. displacement curves are measured to obtain the bursting force ($F_{crit}$) and critical displacement ($h_{crit}$) at rupture.

By "dry microcapsule" is meant microcapsules that have been submitted to usual drying conditions such as those prevailing during line drying or tumble drying.

Perfume-containing microcapsules for use in liquid, aqueous fabric care conditioners constitute a particular embodiment of the present invention and are typically obtained by the following process:

1. Forming an oil-in-water emulsion of perfume under moderate to high shear stirring in the presence of polymer stabilizer, whereby the stirring speed and the geometry of the mixer is defined as a function of the desired average microcapsule size range and microcapsule size distribution. These maters are well within the ordinary skill of the art.
2. Adding the polyamine and at least one substituted methylene compound as hereinabove described,
3. Adjusting the pH to a range of 1 to 7, depending on the reactivity of the substituted methylene compound, by adding a Bronsted acid, such as sulphuric acid, sulfonic acid, hydrochloric acid, formic acid, and the like;
4. While performing Step 3, adding aromatic polyol to the reaction medium, at the beginning, the end or continuously during Step 3; this forms the microcapsule shell,
5. Heating at a temperature ranging from 75° C. to 90° C. for 1 to 5 hours to cure the shell,
6. Cooling the system to room temperature.

In a typical composition according to the invention, the typical amount of perfume oil added to the reaction medium that forms the terpolymer is between 15 and 50 wt %, preferably between 25 and 40 wt %, most preferably between 35 and 40 wt % of the total mix. The composition range of the other ingredients entering in the microencapsulation is given below for a nominal perfume concentration of 38 wt %. However, it will be obvious of anybody skilled in the art that modifying this nominal perfume oil level will require optimization of the levels of the other ingredients.

Hence, for a nominal perfume oil concentration of 38 wt %, the composition of the remaining ingredients in the reaction medium will preferably be as follows:

- 1 to 10 wt %, preferably 2 to 8 wt % and most preferably 3 to 4 wt % of polyamines,
- 0.1 to 3 wt %, preferably 0.3 to 2 wt % and most preferably 0.5 to 1.5 wt % of aromatic polyols,
- 1% to 10% wt %, preferably 2% to 8% wt % and most preferably 3% to 4% of substituted methylene compound, 0.1 to 3 wt %, preferably 0.3 to 2 wt % and most preferably 0.5 to 1.5 wt % of stabilizing polymer.

the balance being water.

Fragrance materials for use in compositions of the present invention may be selected from natural products such as essential oils, absolutes, resinoids, resins, concretes, and synthetic perfume components such as hydrocarbons, alcohols, aldehydes, ketones, ethers, acids, acetals, ketals and nitriles, including saturated and unsaturated compounds, aliphatic, carbocyclic and heterocyclic compounds, or precursors of any of the above. Other examples of odorant compositions which may be used are described in H 1468 (United States Statutory Invention Registration).

Examples of preferred fragrance components are any of those fragrances selected from Agrumex, Aldron, Ambretolide, Ambroxan, benzyl cinnamate, benzyl salicylate, Boisambrene, cedrol, cedryl acetate, Celestolide/Crysolide, Cetalox, citronellyl ethoxalate, Fixal, Fixolide, Galaxolide, Guaiacwood Acetate, cis-3-hexenyl salicylate, hexyl cinnamic aldehyde, hexyl salicylate, Iso E Super, linalyl benzoate, linalyl cinnamate, linalyl phenyl acetate, Javanol, methyl cedryl ketone, Moskene, Musk, Musk Ketone, Musk Tibetine, Musk Xylol, Myraldyl Acetate, nerolidyl acetate, Novalide, Okoumal, para-cresyl caprylate, para-cresyl phenyl acetate, Phantolid, phenyl ethyl cinnamate, phenyl ethyl salicylate, Rose Crystals, Rosone, Sandela, tetradecanitrile, Thibetolide, Traseolide, Trimofix O, 2-methyl pyrazine, acetaldehyde phenylethyl propyl acetal, acetophenone, alcohol C6 (in the following the notation Cn comprises all substances having n carbon atoms and one hydroxyl function), alcohol C8, aldehyde C6 (in the following the notation Cn encompasses all isomers having n carbon atoms and one aldehyde function), aldehyde C7, aldehyde C8, aldehyde C9, nonenylic aldhyde, allyl amyl glycolate, allyl caproate, amyl butyrate, aldehyde anisique, benzaldehyde, benzyl acetate, benzyl acetone, benzyl alcohol, benzyl butyrate, benzyl formate, benzyl iso-valerate, benzyl methyl ether, benzyl propionate, Bergamyl Acetate, butyl acetate, camphor, 3-methyl-5-propyl-2-cyclohexenone, cinnamic aldehyde, cis-3-hexenol, cis-3-hexenyl acetate, cis-3-hexenyl formate, cis-3-hexenyl iso-butyrate, cis-3-hexenyl propionate, cis-3-hexenyl tiglate, citronellal, citronellol, citronellyl nitrile, 2-hydroxy-3-methyl-2-cyclopenten-1-one, cuminic aldehyde, Cyclal C, acetic acid (cycloheyloxy)-2-propenylester, damascenone, alpha-damascone, beta-damascone, decahydro beta-napthyl formate, diethyl malonate, dihydro-jasmone, dihydro-linalool, dihydro-myrcenol, dihydro-terpineol, dimethyl anthranilate, dimethyl benzyl carbinol, dimethyl benzyl carbinyl acetate, dimethyl octenone, Dimetol, dimyrcetol, estragole, ethyl acetate, ethyl aceto-acetate, ethyl benzoate, ethyl heptoate, ethyl linalool, ethyl salicylate, ethyl-2-methyl butyrate, eucalyptol, eugenol, fenchyl acetate, fenchyl alcohol, 4-phenyl-2,4,6-trimethyl 1,3-dioxane, methyl 2-octynoate, 4-isopropylcyclohexanol, 2-sec-butylcyclohexanone, styralyl acetate, geranyl nitrile, hexyl acetate, alpha-ionone, iso-amyl acetate, iso-butyl acetate, iso-cyclocitral, dihydroisojasmone, iso-menthone, iso-pentyrate, iso-pulegol, cis-jasmone, laevocarvone, phenylacetaldehyde glycerylacetal, carbinic acid 3-hexenyl methyl ether, 1-methyl-cyclohexa-1,3-diene, linalool, linalool oxide, 2-ethyl ethyl ester pentanoate, 2,6-dimethyl-5-heptenal, menthol, menthone, methyl acetophenone, methyl amyl ketone, methyl benzoate, alpha-methyl cinnamic aldehyde, methyl heptenone, methyl hexyl ketone, methyl para cresol, methyl phenyl acetate, methyl salicylate, Neral, Nerol, 4-tert-pentyl-cyclohexanone, para-cresol, para-cresyl acetate, para-t-butyl cyclohexanone, para-toluoyl aldehyde, phenyl acetaldehyde, phenyl ethyl acetate, phenyl ethyl alcohol, phenyl ethyl butyrate, phenyl ethyl formate, phenyl ethyl iso butyrate, phenyl ethyl propionate, phenyl propyl acetate, phenyl propyl aldehyde, tetrahydro-2,4-dimethyl-4-pentyl-furan, 4-methyl-2-(2-methyl-1-propenyl)tetrahydropyran, 5-methyl-3-heptanone oxime, styralyl propionate, styrene, 4-methylphenylacetaldehyde, terpineol, terpinolene, tetrahydro-linalool, tetrahydro-myrcenol, trans-2-hexenal, verdyl acetate and Viridine.

In a preferred embodiment of the present invention, the encapsulated fragrance comprises at least 70 wt % of fragrance components having a loss factor higher than $10^2$ Pa ppm, most preferably higher than $10^4$ Pa ppm. The term "Loss Factor" refers to a parameter that is related to the losses of fragrance material during drying and is defined as the product of the pure component vapour pressure (Pa) and the water solubility (ppm) at room temperature. Vapour pressures and water solubility data for commercially available fragrance components are well known and so the Loss Factor for a given fragrance component may be easily calculated. Alternatively, vapour pressure and water solubility measurements may be easily taken using techniques well known in the art. Vapour pressure of fragrance components may be measured using any of the known quantitative headspace analysis techniques, see for example Mueller and Lamparsky in Perfumes: Art, Science and Technology, Chapter 6 "The Measurement of Odors" at pages 176-179 (Elsevier 1991). The water solubility of fragrances may be measured according to techniques known in the art for the measurement of sparingly water-soluble materials. A preferred technique involves the formation of a saturated solution of a fragrance component in water. A tube with a dialysed membrane is placed in the solution such that after equilibration an idealised solution is formed within the tube. The tube may be removed and the water solution therein extracted with a suitable organic solvent to remove the fragrance component. Finally the extracted fragrance component may be concentrated and measured, for example using gas chromatography. Other methods of measuring fragrances are disclosed in Gygax et al, Chimia 55 (2001) 401-405.

Preferred fragrances having high loss factor may be selected from 2-methyl pyrazine, acetaldehyde phenylethyl propyl acetal, acetophenone, alcohol C6 (in the following the notation Cn comprises all substances having n carbon atoms and one hydroxyl function), alcohol C8, aldehyde C6 (in the following the notation Cn encompasses all isomers having n carbon atoms and one aldehyde function), aldehyde C7, aldehyde C8, aldehyde C9, nonenylic aldhyde, allyl amyl glycolate, allyl caproate, amyl butyrate, aldehyde anisique, benzaldehyde, benzyl acetate, benzyl acetone, benzyl alcohol, benzyl butyrate, benzyl formate, benzyl iso-valerate, benzyl methyl ether, benzyl propionate, bergamyl acetate, autyl acetate, camphor, 3-methyl-5-propyl-2-cyclohexenone, cinnamic aldehyde, cis-3-hexenol, cis-3-hexenyl acetate, cis-3-hexenyl formate, cis-3-hexenyl iso-butyrate, cis-3-hexenyl propionate, cis-3-hexenyl tiglate, citronellal, citronellol, citronellyl nitrile, 2-hydroxy-3-methyl-2-cyclopenten-1-one, cuminic aldehyde, cyclal C, acetic acid (cycloheyloxy)-2-propenylester, damascenone, alpha-damascone, beta-damascone, diethyl malonate, dihydro jasmone, dihydro linalool, dihydro myrcenol, dihydro terpineol, dimethyl anthranilate, dimethyl benzyl carbinol, dimethyl benzyl carbinyl acetate, dimethyl octenone, dimetol, dimyrcetol, estragole, ethyl acetate, ethyl aceto acetate, ethyl benzoate, ethyl heptoate, ethyl linalool, ethyl salicylate, ethyl-2-methyl butyrate, eucalyptol, eugenol, fenchyl acetate, fenchyl alcohol, 4-phenyl-2, 4,6-trimethyl 1,3-dioxane, methyl 2-octynoate, 4-isopropylcyclohexanol, 2-sec-butylcyclohexanone, styralyl acetate, geranyl nitrile, hexyl acetate, alpha-ionone, iso-amyl acetate, iso-butyl acetate, iso-cyclocitral, dihydroisojasmone, iso-menthone, iso-pentyrate, iso-pulegol, cis-jasmone, laevo carvone, phenylacetaldehyde glycerylacetal, carbinic acid 3-hexenyl methyl ether, 1-methyl-cyclohexa-1,3-diene, linalool, linalool oxide, 2,6-dimethyl-5-heptenal, menthol, menthone, methyl acetophenone, methyl amyl ketone, methyl benzoate, methyl cinnamic aldehyde alpha, methyl heptenone, methyl hexyl ketone, methyl para-cresol, methyl phenyl acetate, methyl salicylate, neral, nerol, 4-tert-pentyl-cyclohexanone, para-cresol, para-cresyl acetate, para-t-butyl cyclohexanone, para-tolyl aldehyde, phenyl acetaldehyde, phenyl ethyl acetate, phenyl ethyl alcohol, phenyl ethyl butyrate, phenyl ethyl formate, phenyl ethyl iso-butyrate, phenyl ethyl propionate, phenyl propyl acetate, phenyl propyl aldehyde, tetrahydro-2,4-dimethyl-4-pentyl-furan, 4-methyl-2-(2-methyl-1-propenyl)tetrahydropyran, 5-methyl-3-heptanone oxime, styralyl propionate, styrene, 4-methylphenylacetaldehyde, terpineol, terpinolene, tetrahydro linalool, tetrahydro myrcenol, trans-2-hexenal, and Viridine.

In a further specific embodiment of the present invention, the fragrance components may have an odour value higher than 10,000. The odor value is defined as the standard headspace concentration $HS_i^o$ of odorant in thermodynamic equilibrium with this odorant in the standard state (278.15 K, 1 atmosphere), expressed in microgram/1 headspace, divided by the olfactory threshold of this odorant (in microgram/1 headspace) as measured by olfactometry. The standard headspace concentration is related to the vapor pressure of the pure ingredient by the equation:

$$HS_i^o \equiv \frac{m_i^*}{RT} p_i^o$$

where $m_i^*$ is the molar mass of the odorant, R is the gas constant, T the absolute temperature given in Kelvin and $p_i^o$ the standard vapour pressure given in atmosphere.

Precursor of fragrance components may also be provided in fragrance materials in the present invention. Precursors are compounds that, upon cleavage under activating conditions such as light, enzymes, elevated temperature or acidic or alkaline pH-values, provide compounds having fragrance characteristics.

Furthermore, other organoleptic materials may be used in admixture with fragrance ingredients, for example, odour-masking agents, insect repellents and the like.

The amount of fragrance possible to be micro-encapsulated is generally superior to 85 wt %, and even superior to 95 wt %, based on dry material, with a micro-encapsulation yield close or superior to 80 wt %, even for the very volatile components having a Loss Factor of greater than $10^2$ Pa ppm.

In a further specific embodiment, 1% to 100%, preferably 20% to 90% and most preferably 25% to 75% of the fragrance components may have a clogP, the logarithm of calculated octanol/water partition coefficient, value not larger than 4.5, preferably between 2 and 4.5, most preferably between 3 and 4.5.

The amount of fragrance composition employed in perfumed products or articles according to the present invention may vary according to the particular application in which it is employed and on the fragrance loading in the fragrance composition. For laundry applications, one may employ fragrance composition in amounts from 0.01 to 3% by weight of fragrance material based on the total weight of the laundry care product.

The microcapsules according to the invention are especially useful in personal care and household, washing and cleaning products, such as soaps, shampoos, skin care creams, laundry detergents, fabric conditioners, dishwashing liquids, furniture polishes and the like. The invention therefore provides a personal care product, a household product, a washing product or a cleaning product, comprising a composition that comprises microcapsules as hereinabove defined.

There now follows a series of Examples that serve to illustrate embodiments of the present invention. It will be understood that these Examples are illustrative, and the invention is not to be considered as being restricted thereto.

EX 1

Preparation of Microcapsules 1.1 Preparation of Capsules According to the Prior Art The following example illustrates the formation of a modified melamine-formaldehyde microcapsules, using resorcinol as co-monomer. 24.17 g of Lupasol PA140 (ex BASF), 26.25 g of Luracoll SD (ex BASF) was added to 250 g of water in a 1 l jacket reactor. The stirring velocity was adjusted to reach the required particles size and the mixture was heated to a first temperature (35° C.). 200 g of test perfume (table I) were then added to the mixture which was maintained under continuous agitation to allow the formation of an emulsion. The polymerization was started by adjusting the pH value to 3.5 using a 10% solution of formic acid. 12 g of resorcinol (30% solution in water) was added. The reaction temperature was then raised to 75° C. for 90 minutes, in order to achieve complete cross-linking of the microcapsule shell (curing). After 1 hour curing the pH value was adjusted to pH 3.5 by using a formic acid. After 90 minutes the reaction was cooled down and the pH value was adjusted to 9.3 using ammonia.

TABLE I

Composition of test perfume oil

| Fragrance Ingredient | Percentage in Formula |
| --- | --- |
| Verdox | 4.86 |
| anisic aldehyde | 0.73 |
| Benzophenone | 1.46 |
| Benzyl acetate | 0.59 |
| Benzyl salicylate | 2.88 |
| beta-ionone | 18.85 |
| beta-pinene | 0.45 |
| brassylate ethylene | 0.59 |
| cis-3-hexenyl salicylate | 0.45 |
| Coumarine | 0.59 |
| cyclal C | 2.25 |
| Eugenol | 0.59 |
| Galbanone | 3.47 |
| Habanolide | 0.59 |
| Hedione | 0.59 |
| hexyl acetate | 1.73 |
| hexyl cinnamic aldehyde | 5.76 |
| Iso E super | 11.01 |
| Isoraldeine | 5.10 |
| Lilial | 5.83 |
| Linalol | 1.35 |
| Linalyl acetate | 1.46 |
| Nectaryl | 3.47 |
| Oranger | 2.88 |
| beta-decalactone | 3.47 |
| Phenyl ethyl acohol | 2.32 |
| Prenyl acetate | 1.04 |
| Rosacetol | 1.15 |
| Rosaphen | 0.87 |
| Thibetolide | 0.59 |
| Verdyl acetate | 11.28 |

TABLE I-continued

Composition of test perfume oil

| Fragrance Ingredient | Percentage in Formula |
|---|---|
| Verdyl propionate | 0.87 |
| Vertofix | 0.87 |
| Total | 100.00 |

1.2 Using Dimethoxyethanal-Melamine Pre-Condensate

The following example illustrates the formation of melamine-based microcapsules according to the present invention, using dimethoxyethanal-melamine pre-condensate as source of terpolymer methylene moieties, using a terpolymer comprising various co-monomer selected from amino compounds, aliphatic, aromatic and polymeric polyols. 8.10 g Gantrez AN 169 BF (ex ISP) was added to 250 g of water in a 1 l jacket reactor and heated up to 80° C. for 45 minutes until a clear solution is obtained. A solution of 55.89 g of Highlink CDO (ex Clariant) and 20.4 g of resorcinol (30% solution) were added. The stirring velocity was adjusted to reach the required particles size and the mixture was heated to a first temperature (35° C.). 200 g of test perfume were then added to the mixture which was maintained under continuous agitation to allow the formation of an emulsion. The polymerization was started by adjusting the pH value to 5.2 using a 10% solution of formic acid. The reaction temperature was then raised to 75° C. for 90 minutes, in order to achieve complete cross-linking of microcapsule shell (curing). After 1 hour curing the pH value was adjusted to pH 3.5 by using a formic acid. After 90 minutes the reaction was cooled down and the pH value was adjusted to 8 using ammonia.

1.3 Using Methylglyoxylatemethylhemiacetal (GMHA)

The following example illustrates the formation of new formaldehyde-free melamine-based microcapsules according to the present invention, using GMHA as source of terpolymer methylene moieties. A mixture of 20.4 g melamine, 18 g GMHA (ex. DSM) 5.6 g resorcinol and 12 g of water were heated up 80° C. for 10 minutes until a clear solution is obtained. Separately an emulsion comprising 200 g water, 200 g test perfume and 2 g polymer stabilizer was prepared in a 1 l jacket reactor. The stirring velocity was adjusted to reach the required particles size and the mixture was heated to a first temperature (35° C.). After adding the solution of melamine, GMHA and resorcinol, the reaction temperature was raised to 80° C. in order to start the polymerization. After 240 minutes the reaction was cooled down to room temperature.

EXAMPLE 2

Determination of Formaldehyde

The residual free formaldehyde level in the microcapsule slurry is determined by high-performance-liquid-chromatography (HPLC) according to Method 8315A of the Environmental Protection Agency (EPA). Hereunto, depending on the expected amount of free formaldehyde, 100 mg to 1 g of slurry is weighted in a 10 ml flask and the volume completed with water. The solution/suspension is exposed for 10 minutes to an ultrasonic bath. The microcapsules are separated from the liquid phase by filtration or centrifugation. Derivatization of the free formaldehyde is achieved by mixing 3 µl of the liquid phase with 6 µl of a solution of 2,4-dinitro-phenylhydrazine DNPH at 1 wt % in acetonitrile.

The analysis is carried out by injecting this mixture in an Agilent 1100 HPLC system equipped with an UV diode-array detector (DAD). Typical results are summarized in Table I.

TABLE I

Impact of methylene moiety selection on total formaldehyde level.

| Sample # | HCHO level in the slurry [ppm] |
|---|---|
| Example 1.1 | 370 |
| Example 1.2 | Not detectable |
| Example 1.3 | Not detectable |

The invention claimed is:

1. Microcapsules comprising a core of fragrance and a shell of aminoplast polymer, the composition of the shell being from 75-100% of a thermoset resin comprising 50-90% of a terpolymer and from 10-50% of a polymeric stabilizer; the terpolymer comprising:
   (a) from 20-60% of moieties derived from at least one polyamine;
   (b) from 3-50% of moieties derived from at least one polyol; and
   (c) from 20-70% of substituted methylene moieties, wherein the substituted methylene moieties have the general formula (1)

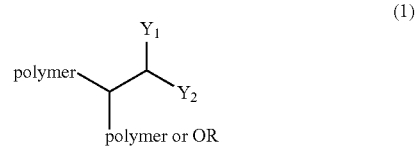

in which R is either a hydrogen atom or an alkyl group, and $Y_1$ and $Y_2$ are substituents selected from sigma acceptor groups, alkyne groups and metal sulphonates,
   the microcapsules additionally optionally comprising up to 25% of a cationic polymer.

2. Microcapsules according to claim 1, in which the polyamine moieties are derived from at least one moiety selected from the group consisting of: urea, melamine, 6-substituted 2,4-diamino-1,3,5-triazin and glycoluril.

3. Microcapsules according to claim 1, in which the polyol moieties are derived from the group consisting of: phenol, 3,5-dihydroxy toluene, Bisphenol A, resorcinol, hydroquinone, xylenol, polyhydroxy naphthalene, polyphenols produced by the degradation of cellulose and humic acids, 2,2-dimethyl-1,3-propane diol, 1,1,1-tris-(hydroxymethy p-propane, pentaerythritol, sorbitol and sugars.

4. Microcapsules according to claim 1, in which the substituted methylene moieties are derived from at least one compound having a formula selected from formulae (2) and (3)

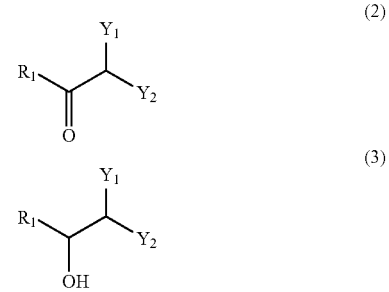

wherein $R_1$ is either a hydrogen atom or an alkyl group; and,
$Y_1$ and $Y_2$ are substituents selected from sigma acceptor groups, alkyne groups and metal sulphonates.

5. Microcapsules according to claim 1, in which the polymeric stabilizer is an anionic polyelectrolyte.

6. Microcapsules according to claim 1, in which there is present a cationic polymer, selected from the group consisting of: cationic cellulose derivatives, quaternized gums, polyethylene imine, cationic polyacrylates and acrylamides, gelatine and quaternized protein hydrolysates, and quaternized amino silicones.

7. A fragranced personal care, household, washing and cleaning product comprising microcapsules according to claim 1.

8. A product according to claim 7, selected from laundry solid and liquid detergents and liquid fabric softeners and fabric conditioners.

9. A product according to claim 8, in which the product contains free perfume.

10. A product according to claim 9, in which the free perfume differs in strength and/or quality from the encapsulated perfume.

11. A fabric conditioner product according to claim 8, in which the microcapsules are present in an anionic form.

12. Microcapsules according to claim 1, comprising a core of fragrance and a shell of aminoplast polymer, the composition of the shell being from 75-100% of a thermoset resin comprising from 60-85%, of a terpolymer and from 10-25%, of a polymeric stabilizer; the terpolymer comprising:
   (a) from 20-60%, of moieties derived from at least one polyamine;
   (b) from 3-50of moieties derived from at least one polyol; and
   (c) from 20-70%, of substituted methylene moieties wherein the substituted methylene moieties have the general formula (1)

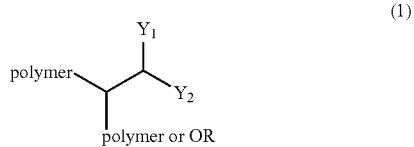

in which R is either a hydrogen atom or an alkyl groups, and $Y_1$ and $Y_2$ are substituents selected from sigma acceptor groups, alkyne groups and metal sulphonates, the microcapsules additionally optionally comprising up to 25%, of a cationic polymer.

13. Microcapsules according to claim 1, comprising a core of fragrance and a shell of aminoplast polymer, wherein the terpolymer comprises:
   (a) 30-50% of moieties derived from at least one polyamine;
   (b) 3-50% of moieties derived from at least one polyol; and
   (c) 20-70% of substituted methylene moieties wherein the substituted methylene moieties have the general formula (1)

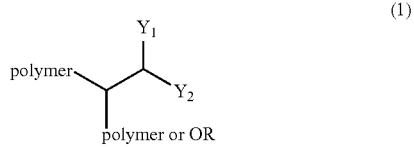

in which R is either a hydrogen atom or an alkyl group, and $Y_1$ and $Y_2$ are substituents selected from sigma acceptor groups, alkyne groups and metal sulphonates, the microcapsules additionally optionally comprising up to 25% of a cationic polymer.

14. Microcapsules according to claim 1, comprising a core of fragrance and a shell of aminoplast polymer, wherein the terpolymer comprises:
   (a) 20-60% of moieties derived from at least one polyamine;
   (b) 5-25% of moieties derived from at least one polyol; and
   (c) 20-70% of substituted methylene moieties,
   wherein the substituted methylene moieties have the general formula (1)

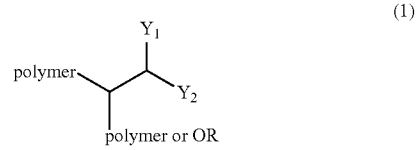

in which R is either a hydrogen atom or an alkyl group, and $Y_1$ and $Y_2$ are substituents selected from sigma acceptor groups, alkyne groups and metal sulphonates, the microcapsules additionally optionally comprising up to 25% of a cationic polymer.

15. Microcapsules according to claim 1, comprising a core of fragrance and a shell of aminoplast polymer, the composition of the shell being from 75-100% of a thermoset resin comprising from 60-85%, of a terpolymer and from 10-25%, of a polymeric stabilizer; the terpolymer comprising:
   (a) 20-60% of moieties derived from at least one polyamine;
   (b) 3-50% of moieties derived from at least one polyol; and
   (c) 40-60% of substituted methylene moieties,
   wherein the substituted methylene moieties have the general formula (1)

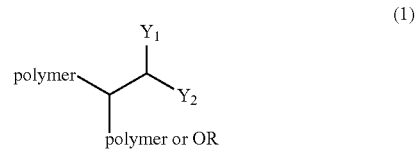

in which R is either a hydrogen atom or an alkyl group, and $Y_1$ and $Y_2$ are substituents selected from sigma acceptor groups, alkyne groups and metal sulphonates, the microcapsules additionally optionally comprising up to 25%, of a cationic polymer.

16. Microcapsules according to claim 1, which additionally comprise up to 25% of a cationic polymer.

17. Microcapsules according to claim 16, which additionally comprise up to 10% of a cationic polymer.

* * * * *